United States Patent
Kang et al.

(10) Patent No.: US 11,745,692 B2
(45) Date of Patent: Sep. 5, 2023

(54) CURTAIN AIRBAG APPARATUS FOR VEHICLE

(71) Applicants: Hyundai Motor Company, Seoul (KR); Kia Corporation, Seoul (KR)

(72) Inventors: Seung Kyu Kang, Gyeonggi-Do (KR); Jae Deok Byeon, Gyeonggi-Do (KR); Eun Mook Park, Gyeonggi-Do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/692,933

(22) Filed: Mar. 11, 2022

(65) Prior Publication Data
US 2023/0021237 A1 Jan. 19, 2023

(30) Foreign Application Priority Data
Jul. 14, 2021 (KR) .................. 10-2021-0092403

(51) Int. Cl.
*B60R 21/232* (2011.01)
*B60R 21/2338* (2011.01)

(52) U.S. Cl.
CPC ........ *B60R 21/232* (2013.01); *B60R 21/2338* (2013.01)

(58) Field of Classification Search
CPC . B60R 21/213; B60R 21/232; B60R 21/2338; B60R 2021/0006; B60R 2021/23386; B60R 2021/23388
See application file for complete search history.

(56) References Cited

U.S. PATENT DOCUMENTS

| | | | | |
|---|---|---|---|---|
| 5,924,723 A * | 7/1999 | Brantman | ............. | B60R 21/232 280/730.2 |
| 5,975,566 A * | 11/1999 | Bocker | ............... | B60R 21/2338 280/730.2 |
| 6,237,938 B1 * | 5/2001 | Boxey | ................. | B60R 21/2338 280/730.2 |
| 6,435,545 B1 * | 8/2002 | Osentoski | ............. | B60R 21/232 280/730.2 |
| 6,471,240 B2 * | 10/2002 | Bakhsh | ................. | B60R 21/232 280/730.2 |
| 6,474,681 B2 * | 11/2002 | Peer | ...................... | B60R 21/232 280/730.2 |
| 6,565,118 B2 * | 5/2003 | Bakhsh | ................. | B60R 21/232 280/730.2 |
| 6,709,010 B2 * | 3/2004 | Dominissini | ....... | B60R 22/1953 280/730.2 |

(Continued)

FOREIGN PATENT DOCUMENTS

KR 1 0-2008-0043946 5/2008

*Primary Examiner* — Laura Freedman
(74) *Attorney, Agent, or Firm* — MORGAN, LEWIS & BOCKIUS LLP

(57) ABSTRACT

A curtain airbag apparatus for a vehicle is configured to connect a curtain airbag cushion to a vehicle body by a cushion restriction device including a tether carriage and a cushion tether to reinforce a restriction force of the deployed curtain airbag cushion, and to reinforce restriction on movement of an occupant during a side collision by use of the curtain airbag cushion having the reinforced restriction force to prevent the occupant from being thrown through a vehicle side window during a side collision even when a panorama window is used as the side window.

15 Claims, 10 Drawing Sheets

(56) References Cited

U.S. PATENT DOCUMENTS

| | | | | |
|---|---|---|---|---|
| 6,733,035 B2* | 5/2004 | Thomas | ............... | B60R 21/232 280/730.2 |
| 6,896,288 B2* | 5/2005 | Tanaka | ................. | B60R 21/232 280/730.2 |
| 7,044,500 B2* | 5/2006 | Kalandek | ............ | B60R 21/2338 280/730.2 |
| 7,267,364 B2* | 9/2007 | Noguchi | ............ | B60R 21/2338 280/730.2 |
| 7,273,228 B2* | 9/2007 | Noguchi | ............... | B60R 21/213 280/730.2 |
| 7,306,258 B2* | 12/2007 | Noguchi | ............ | B60R 21/2338 280/730.2 |
| 7,347,446 B2* | 3/2008 | Inoue | ................... | B60R 21/213 280/730.2 |
| 7,347,447 B2* | 3/2008 | Nakanishi | ........... | B60R 21/2338 280/730.2 |
| 7,628,421 B2* | 12/2009 | Wright | ............... | B60R 21/2338 280/730.2 |
| 7,712,773 B2* | 5/2010 | Walston | ............. | B60R 21/2338 280/730.2 |
| 7,874,579 B2* | 1/2011 | Yokota | ................. | B60R 21/232 280/730.2 |
| 9,994,182 B1* | 6/2018 | Jaradi | ................... | B60R 21/214 |
| 2005/0046159 A1* | 3/2005 | Noguchi | ............ | B60R 21/2338 280/730.2 |
| 2011/0285115 A1* | 11/2011 | Putala | ................ | B60R 21/2338 280/730.2 |

* cited by examiner

CURTAIN AIRBAG APPARATUS FOR VEHICLE

CROSS REFERENCE TO RELATED APPLICATION

The present application claims priority to Korean Patent Application No. 10-2021-0092403, filed Jul. 14, 2021, the entire contents of which is incorporated herein for all purposes by this reference.

BACKGROUND OF THE PRESENT DISCLOSURE

Field of the Present Disclosure

The present disclosure relates to a curtain airbag apparatus for a vehicle, and more particularly, to a vehicle curtain airbag apparatus capable of preventing an occupant from being thrown out of the vehicle through a side window in a side collision.

Description of Related Art

An autonomous vehicle refers to a smart vehicle incorporating autonomous driving technology that finds a destination without the driver directly operating a steering wheel, an accelerator pedal, or a brake. Technology development for the autonomous vehicle is rapidly progressing.

A purpose built vehicle (PBV), a type of autonomous vehicle, is an eco-friendly mobility solution which may be used for short-distance cargo transportation or to provide customized services to occupants during the time of traveling to their destination on the ground. A single PBV can accommodate a large number of occupants, and occupants may not be able to wear seat belts like a regular bus traveling on city roads In the autonomous vehicle such as the PBV, a large panorama window may be used as a side glass of the vehicle to improve a sense of openness from the vehicle interior and increase visibility of occupants. A vehicle to which the panorama window is used has a risk of a passenger being thrown out of the vehicle through the side window in a side collision.

When the panorama window is used as the vehicle side window, the height of a vehicle body or a trim to support the panoramic window is greatly reduced, and thus causing the upper body of the occupant to rotate toward the side window on the pelvis or the stomach in contact with the vehicle body in a side collision, so that the occupant is thrown out of the vehicle.

Although a curtain airbag apparatus may be provided to prevent the occupant from being thrown out of the vehicle through the side window in a side collision, a force restricting the occupant by use of a deployed curtain airbag cushion is less in the vehicle having the panorama window as the side window, and the occupant may be efficiently protected.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a curtain airbag apparatus of a vehicle, the curtain airbag apparatus being configured such that, a restriction force of a deployed curtain airbag cushion is reinforced by a connection structure between the curtain airbag cushion and a vehicle body, and the curtain airbag cushion having the reinforced restriction force reinforces the restriction on occupant movement in a side collision, and thus preventing the occupant from being thrown a side window in a side collision even when a panorama window is used as the side window to improve the safety of an occupant and the marketability of the vehicle.

In various aspects of the present disclosure, there is provided a curtain airbag apparatus of a vehicle, the curtain airbag apparatus including: an inflator securely provided on a roof side panel of the vehicle; a curtain airbag cushion connected to the inflator, and provided at the roof side panel in a folded state while extending in a longitudinal direction of the vehicle; and a cushion restriction device connecting the curtain airbag cushion to a vehicle body, and configured to move along a deployment direction of the curtain airbag cushion during deployment of the curtain airbag cushion, and configured to reinforce a restriction force of the curtain airbag cushion by acting a support force with respect to an external force when the external force is applied to the deployed curtain airbag cushion.

The curtain airbag cushion may be folded in a zig-zag manner so that a ridge portion thereof and a valley portion thereof may be alternately arranged and overlap with each other to be in a surface-contact each other.

The curtain airbag cushion may be taped by a holding member in the folded state and then be mounted to the roof side panel.

The cushion restriction device may include: a tether carriage configured to move in vertical and horizontal directions along a guide hole of a pillar trim forming the vehicle body; and a cushion tether coupled to the curtain airbag cushion and the tether carriage to connect the curtain airbag cushion to the tether carriage.

The guide hole formed in the pillar trim may include: a vertical hole extended downwardly from an upper portion of the pillar trim; and a horizontal hole extending from a lower end portion of the vertical hole in an outward direction from a side surface of the vehicle.

The guide hole may include a slit hole to connect an upper end portion of the vertical hole to an upper end portion of the pillar trim.

When the curtain airbag cushion is in the folded state, the tether carriage may be located at an upper end portion of the vertical hole; when the curtain airbag cushion is deployed, a deployment force of the curtain airbag cushion may be transmitted to the tether carriage via the cushion tether so that the tether carriage may move downward along the vertical hole; when the external force generated by an occupant is applied to the curtain airbag cushion after the curtain airbag cushion is deployed, the external force of the occupant may be transmitted to the tether carriage via the cushion tether so that the tether carriage may move from the lower end portion of the vertical hole in the outward direction from the side surface of the vehicle along the horizontal hole; and when the tether carriage is blocked by an end portion of the horizontal hole and stops moving, the restriction force of the curtain airbag cushion by the cushion tether may be reinforced.

The curtain airbag apparatus may include: a carriage holder provided at an upper end portion of the vertical hole of the pillar trim and configured to hold a location of the tether carriage as the tether carriage is inserted into the carriage holder in the folded state of the curtain airbag cushion, wherein, when deployment pressure of the curtain airbag cushion is transmitted to the tether carriage via the cushion tether during deployment of the curtain airbag cushion, a lower surface of the carriage holder may be broken and the tether carriage may be separated from the carriage holder and move downward along the vertical hole.

The tether carriage may include: a carriage protrusion configured to move along the guide hole while being inserted into the guide hole; and a tether coupling portion formed by protruding from the carriage protrusion and connected to the cushion tether.

The curtain airbag apparatus may include: a tearing bar provided at an upper end portion of a vertical hole to cross the vertical hole and configured to hold a location of the tether carriage by being in contact with a lower end portion of the carriage protrusion in the folded state of the curtain airbag cushion, wherein, when deployment pressure of the curtain airbag cushion is transmitted to the tether carriage via the cushion tether during deployment of the curtain airbag cushion, the tearing bar may be broken and the tether carriage may move downward along the vertical hole.

The curtain airbag apparatus may include: a carriage holder provided at an upper end portion of the vertical hole of the pillar trim and configured to store the tether carriage in the carriage holder in the folded state of the curtain airbag cushion; and a tearing bar provided to cross the vertical hole to be in contact with the carriage protrusion protruding from the tether carriage, wherein, when deployment pressure of the curtain airbag cushion is transmitted to the tether carriage via the cushion tether during deployment of the curtain airbag cushion, a lower end portion of the carriage holder and the tearing bar may be broken and the tether carriage may move downward along the vertical hole.

The pillar trim including the guide hole for movement of the tether carriage may be a center pillar trim forming the vehicle body in cooperation with a center pillar panel of the vehicle.

According to an exemplary embodiment of the present disclosure, the curtain airbag apparatus of a vehicle is configured such that, the curtain airbag cushion is connected to the vehicle body by the cushion restriction device including the tether carriage and the cushion tether to reinforce the restriction force of the deployed curtain airbag cushion, and the occupant movement is more restricted in a side collision by the curtain airbag cushion having the reinforced restriction force. Accordingly, even when the panorama window is used as the vehicle side window, the occupant may be prevented from being thrown through the side window in a side collision, and thus promoting the improvement in occupant safety in a side collision and the improvement in the marketability of the vehicle.

The methods and apparatuses of the present disclosure have other features and advantages which will be apparent from or are set forth in more detail in the accompanying drawings, which are incorporated herein, and the following Detailed Description, which together serve to explain predetermined principles of the present disclosure.

BRIEF DESCRIPTION OF THE DRAWINGS

The above and other objectives, features, and other advantages of the present disclosure

Figure 1:
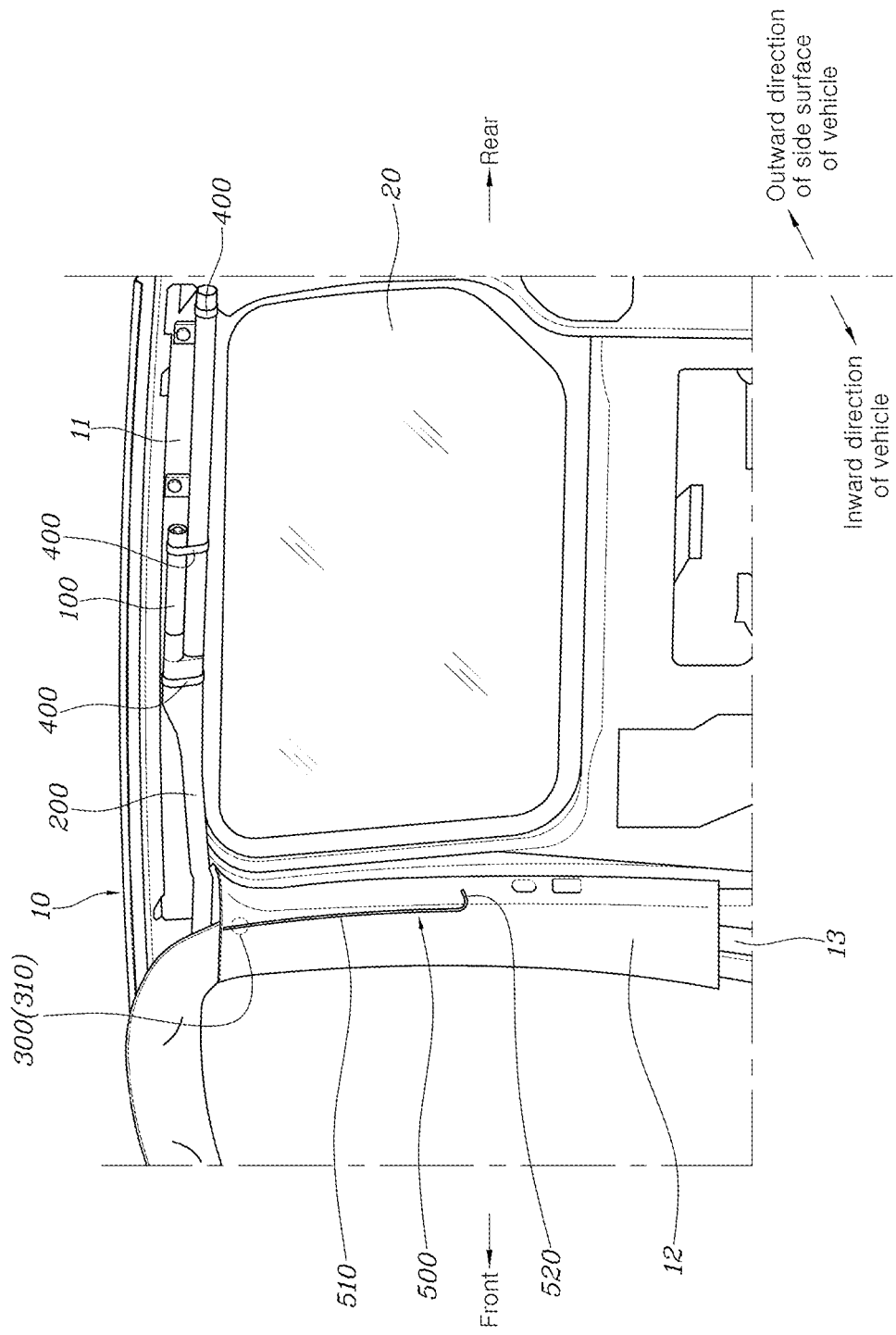
FIG. 1 is a view from the interior of a vehicle provided with a curtain airbag apparatus according to an exemplary embodiment of the present disclosure.
Figure 2:
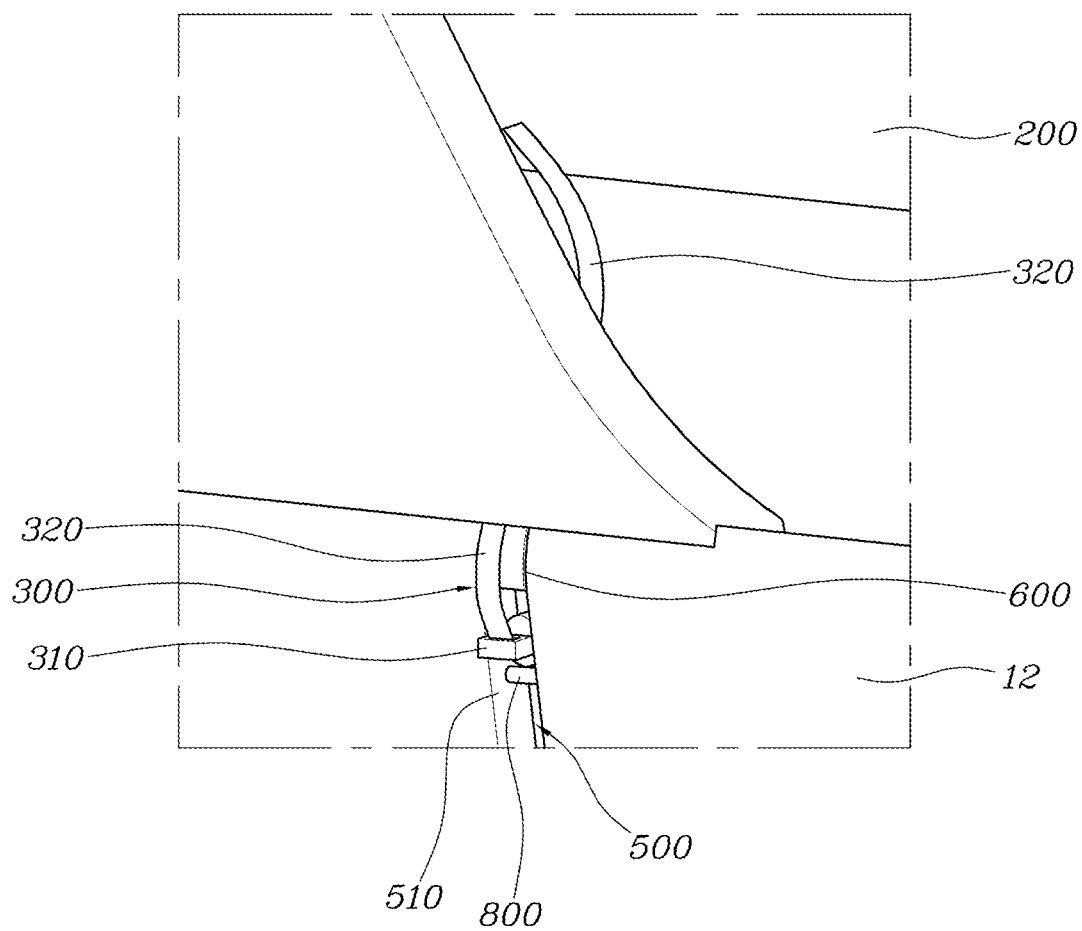
FIG. 2 is an enlarged view showing an upper end portion of a pillar trim in which a tether carriage is located in FIG. 1.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, the structural or functional description specified to exemplary embodiments according to the concept of the present disclosure is directed to describe the exemplary embodiments of the present disclosure, so it should be understood that the present disclosure may be variously embodied, without being limited to the exemplary embodiments of the present disclosure.

Embodiments described herein may be changed in various ways and various shapes, so specific embodiments are shown in the drawings and will be described in detail in the exemplary embodiment of the present disclosure. However, it should be understood that the exemplary embodiments according to the concept of the present disclosure are not limited to the exemplary embodiments which will be described hereinbelow with reference to the accompanying drawings, but all of modifications, equivalents, and substitutions are included in the scope and spirit of the present disclosure.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be directly connected to or directly coupled to another element or be connected to or coupled to another element, including the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent" or "directly adjacent" should be construed in the same manner.

The terminology used herein is for describing various exemplary embodiments only and is not intended to limit the present disclosure. Singular forms are intended to include plural forms unless the context clearly indicates otherwise. It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which an exemplary embodiment of the present disclosure belongs. It must be understood that the terms defined by the dictionary are identical with the meanings within the context of the related art, and they should not be ideally or excessively formally defined unless the context clearly dictates otherwise.

A controller according to the exemplary embodiment of the present disclosure may be realized by a nonvolatile memory, which includes an algorithm configured to control operations of various components of a vehicle or data regarding software instructions to play the algorithm, and a processor, which is configured to perform operations described below using the data stored in the memory. Here, the memory and processor may be realized as separate chips. Alternately, the memory and processor may be realized as an integrated single chip. The processor may have at least one form of a processor.

Hereinbelow, a curtain airbag apparatus of a vehicle according to various exemplary embodiments of the present disclosure will be described with reference to accompanying drawings.

The exemplary embodiment of the present disclosure is a curtain airbag apparatus of an autonomous vehicle provided with a panorama window as a vehicle side window. The curtain airbag apparatus is configured to reinforce a restriction force of a deployed curtain airbag cushion by a connection structure between the curtain airbag cushion and a vehicle body, and to reinforce restriction on the movement of an occupant during a side collision by use of the curtain airbag cushion having the reinforced restriction force to prevent the occupant from being thrown through a side window.

For realizing the above purpose, the curtain airbag apparatus according to various exemplary embodiments of the present disclosure may include an inflator 100 securely provided on a roof side panel 11; a curtain airbag cushion 200 connected to the inflator 100, and provided at the roof side panel 11 in a folded state while extending in a longitudinal direction of the vehicle; and a cushion restriction device 300 connecting the curtain airbag cushion 200 to a vehicle body 10, configured to move along a deployment direction of the curtain airbag cushion 200 during deployment of the curtain airbag cushion 200, and configured to reinforce a restriction force of the curtain airbag cushion 200 by acting a support force with respect to an external force applied to the deployed curtain airbag cushion.

The curtain airbag apparatus according to an exemplary embodiment of the present disclosure is provided in an autonomous vehicle such as PBV, and in particular, in a vehicle provided with a large panorama window 20 as a vehicle side window.

Figure 3:
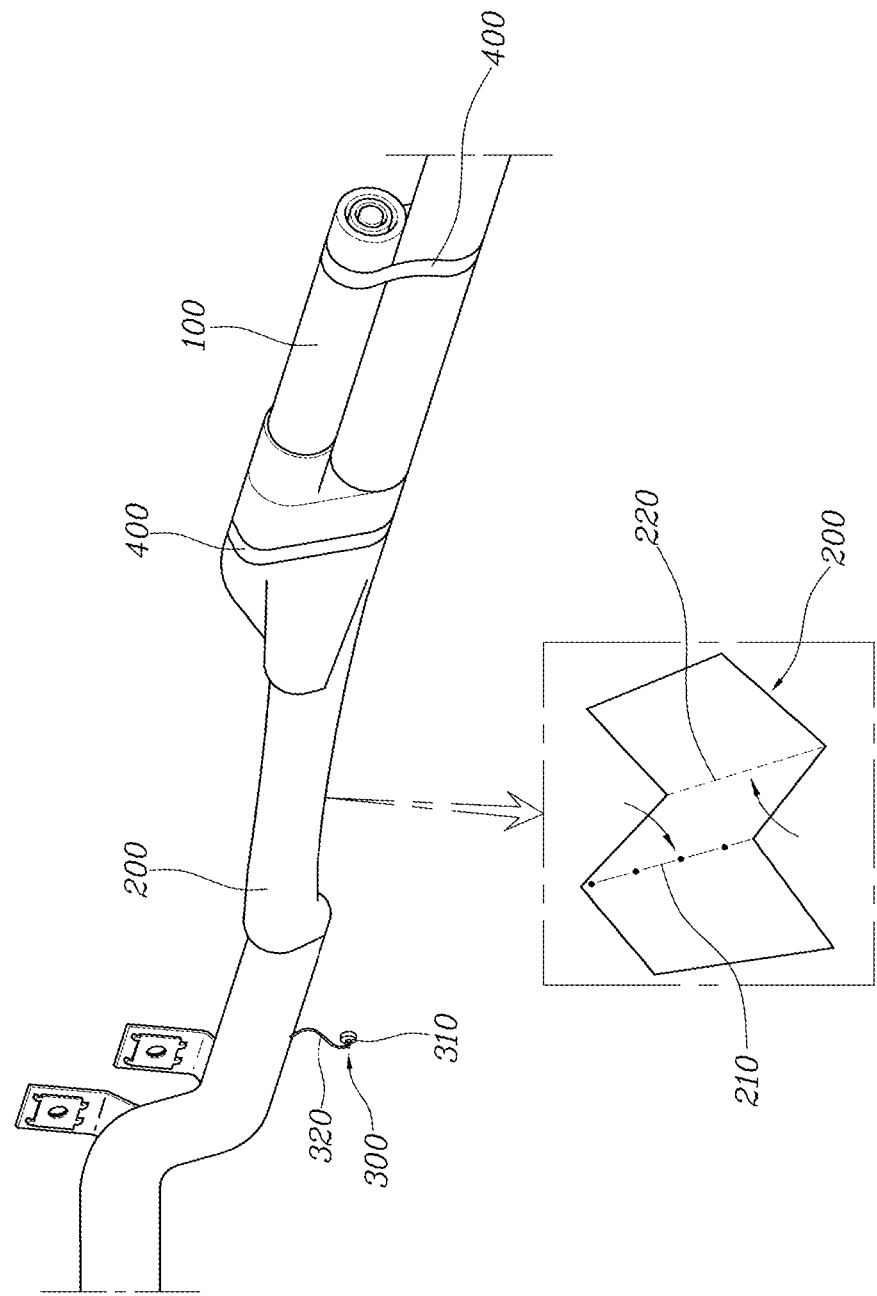
FIG. 3 is a view showing a curtain airbag cushion folded according to an exemplary embodiment of the present disclosure.
Figure 4:
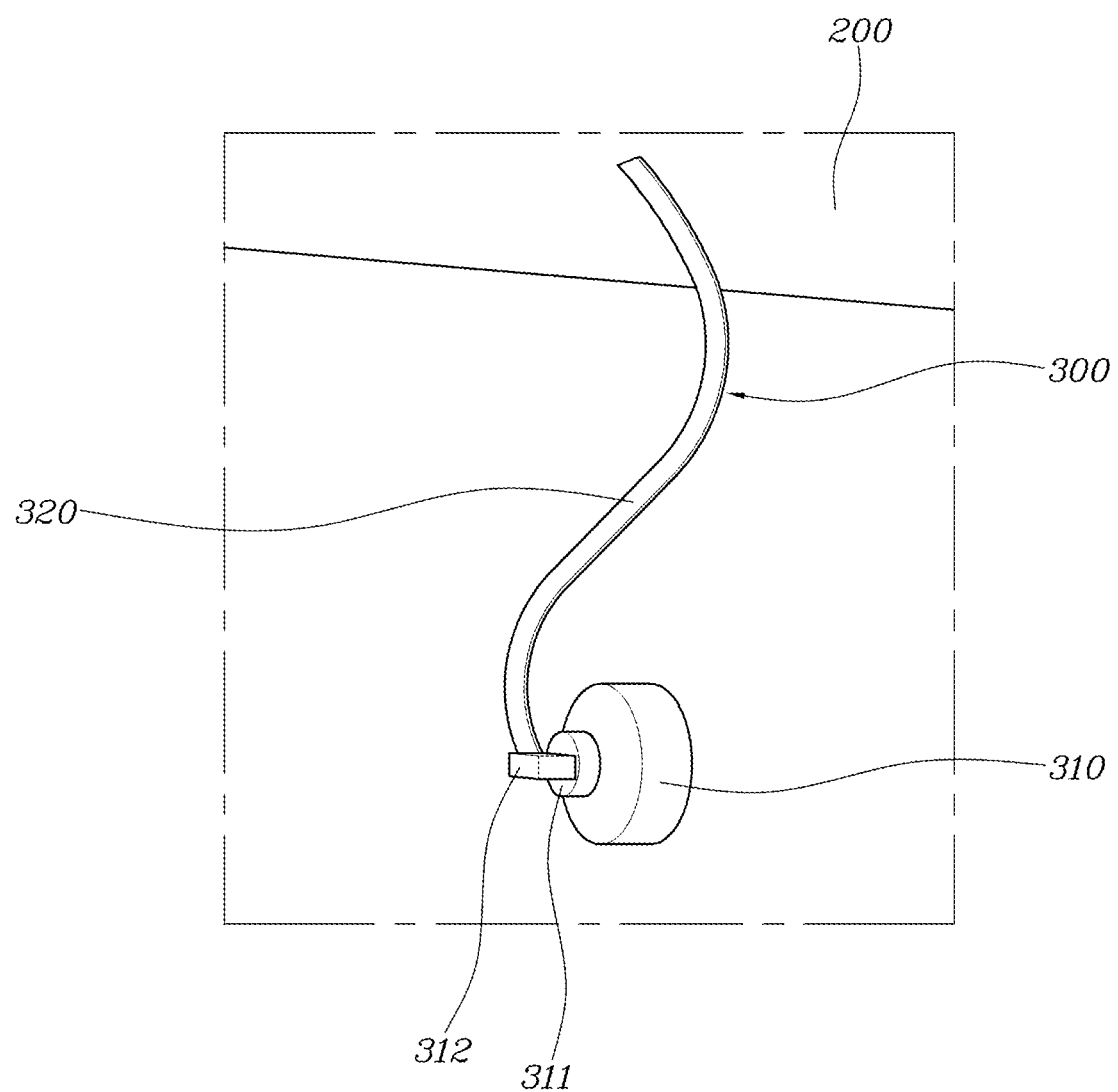
FIG. 4 is an enlarged view showing a portion where a cushion restriction device is located in FIG. 3.
Figure 5:
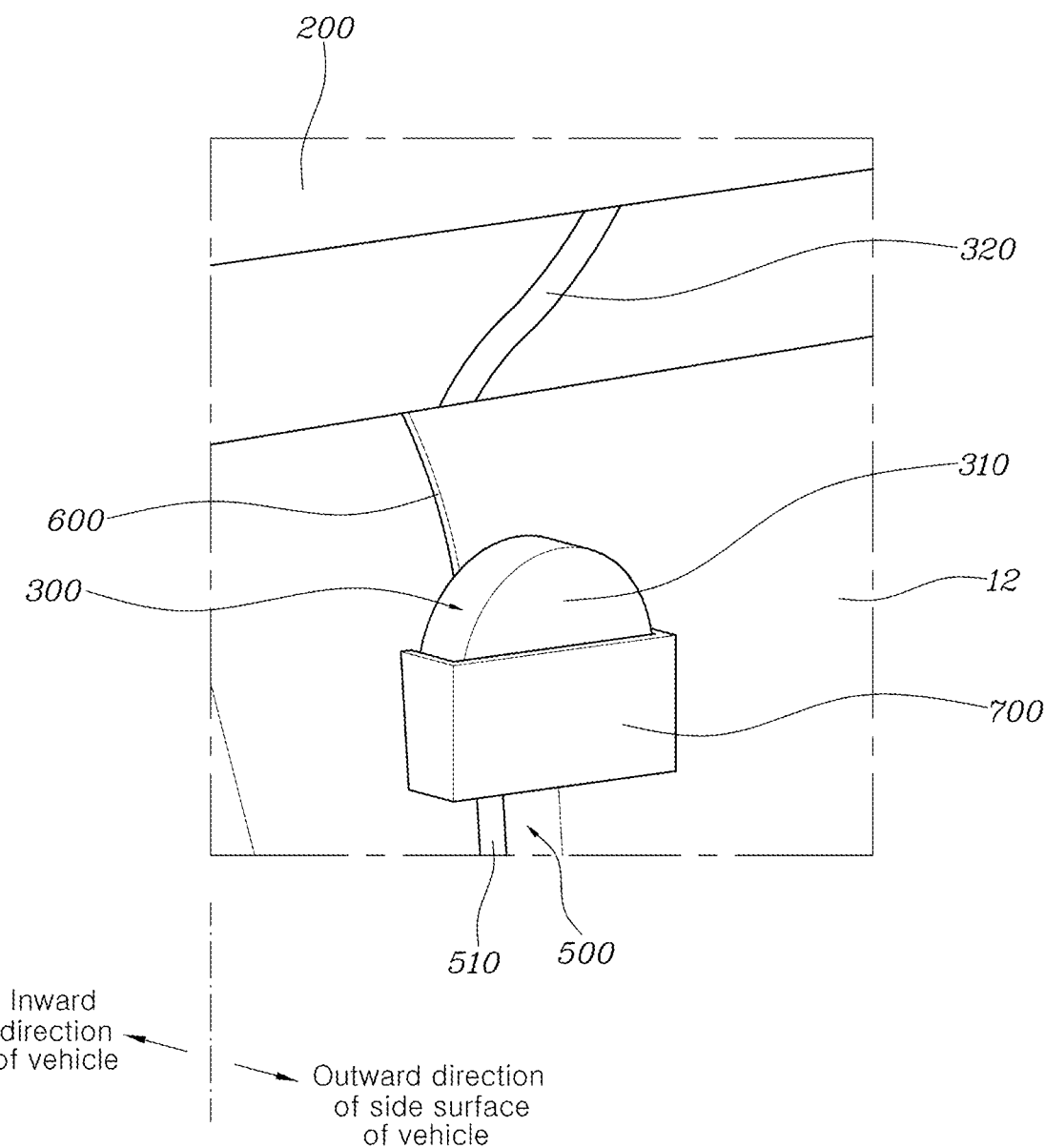
FIG. 5 is a view showing a state in which the tether carriage is inserted into a carriage holder.
Figure 6:
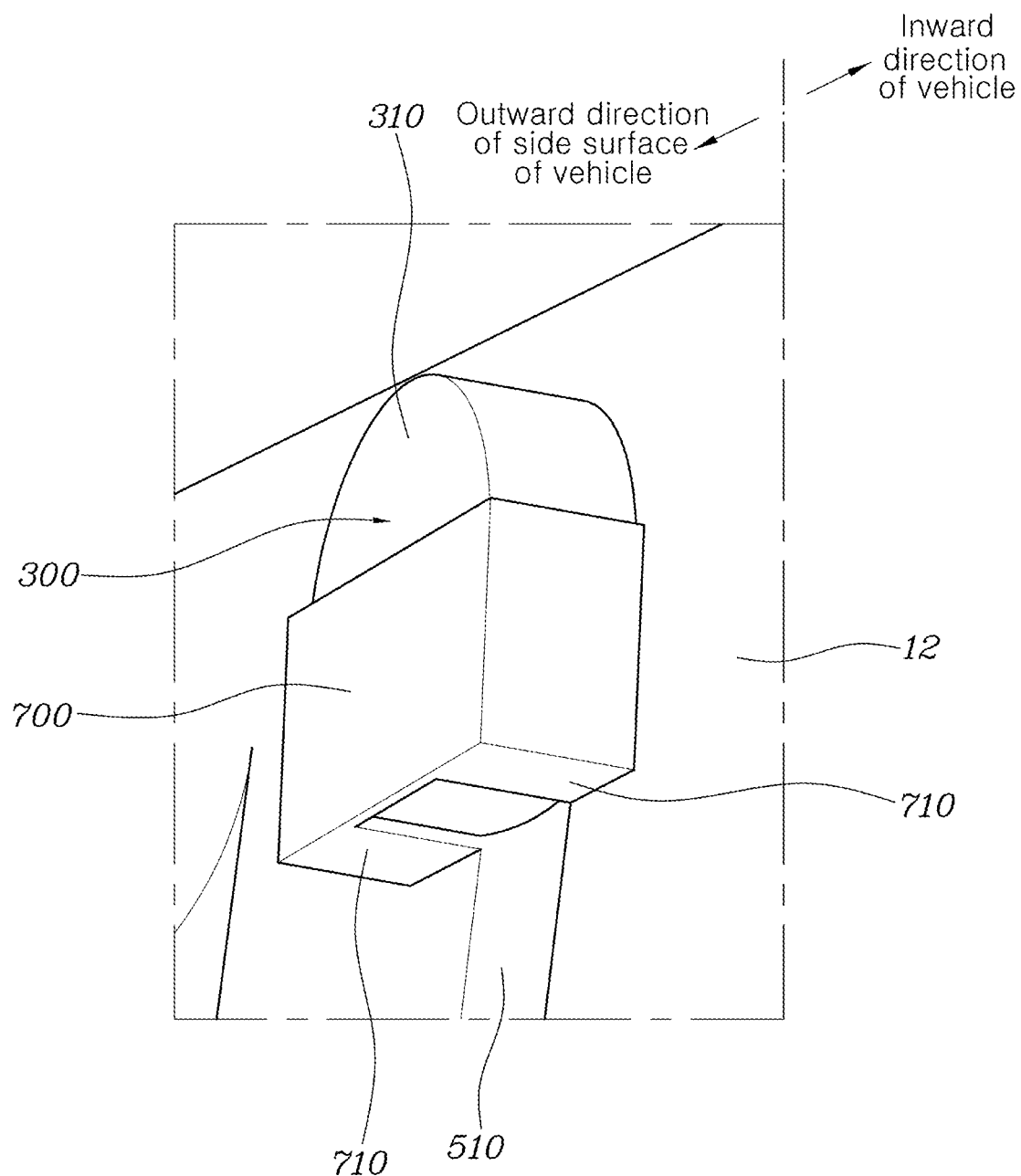
FIG. 6 is a view of FIG. 5 from the lower side.
Figure 7:
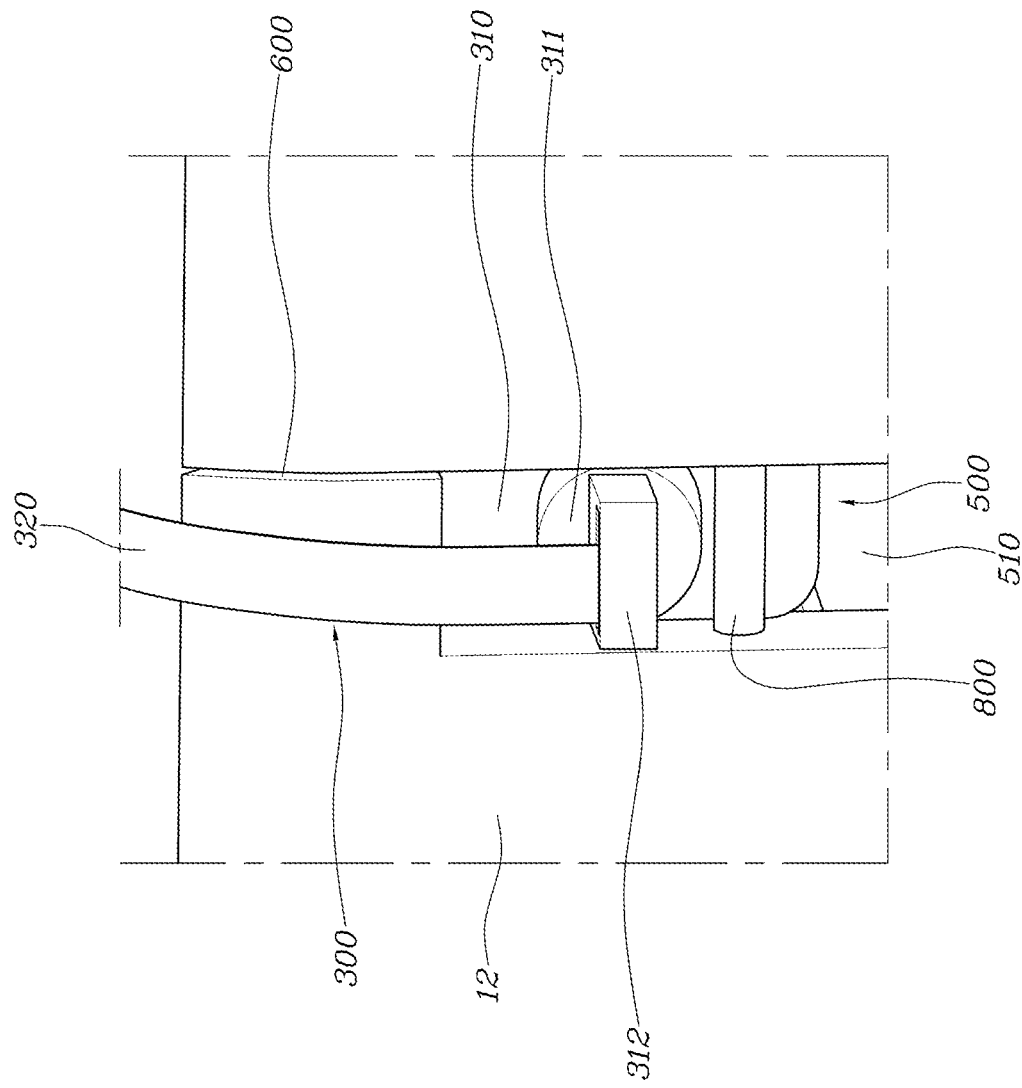
FIG. 7 is a view of FIG. 5 from the interior of the vehicle.

As shown in FIG. 3, the curtain airbag cushion 200 is folded in zig-zag method, and during folding, a ridge portion 210 and a valley portion are alternately arranged and folded to be in a surface-contact each other.

The zig-zag-folding structure is advantageous to deployment of the curtain airbag cushion 200. The zig-zag-folding structure is advantageous to movement of a tether carriage 310 and a cushion tether 320 that form the cushion restriction device 300.

The curtain airbag cushion 200 is taped by a holding member 400 in the folded state thereof and then mounted to the roof side panel 11. The holding member 400 may be a tape member, but is not limited thereto. The holding member 400 is torn by deployment pressure of the curtain airbag cushion 200 during deployment of the curtain airbag cushion 200, so that the curtain airbag cushion 200 may be efficiently deployed.

According to an exemplary embodiment of the present disclosure, the cushion restriction device 300 includes: the tether carriage 310 configured to move in vertical and horizontal directions along a guide hole 500 of a pillar trim 12 forming the vehicle body 10; and the cushion tether 320 coupled to both the curtain airbag cushion 200 and the tether carriage 310 to connect the curtain airbag cushion 200 to the tether carriage 310.

The pillar trim 12 in which the guide hole 500 is formed for movement of the tether carriage 310 may be a center pillar trim forming the vehicle body 10 in cooperation with a center pillar panel 13, but is not limited thereto.

The guide hole 500 formed in the pillar trim 12 includes: a vertical hole 510 extending downwardly from an upper portion of the pillar trim 12 to a lower portion of the pillar trim 12, and a horizontal hole 520 extending from a lower end portion of the vertical hole 510 in an outward direction from a side surface of the vehicle.

An upper end portion of the vertical hole 510 is connected to a slit hole 600, and the slit hole 600 is formed to be open at an upper end portion of the pillar trim 12. Therefore, the cushion tether 320 is inserted through the slit hole 600 to be located in the vertical hole 510.

The curtain airbag apparatus includes a carriage holder 700 at an upper end portion of the vertical hole 510 of the pillar trim 12. The carriage holder 700 holds a location of the tether carriage 310 as the tether carriage 310 is inserted into carriage holder 700 in the folded state of the curtain airbag cushion 200.

When the curtain airbag cushion 200 is deployed by airbag gas generated by operation of the inflator 100, the deployment pressure of the curtain airbag cushion 200 is transmitted to the tether carriage 310 via the cushion tether 320, and a lower surface 710 of the carriage holder 700 in which the tether carriage 310 is inserted is torn. Therefore, the tether carriage 310 is separated from the carriage holder 700 and moves downward along the vertical hole 510.

The tether carriage 310 includes: a carriage protrusion 311 moving along the guide hole 500 while being inserted into the guide hole 500; and a tether coupling portion 312 protruding from the carriage protrusion 311 and connected to the cushion tether 320.

An upper end portion of the cushion tether 320 is sewing-coupled to a lower end portion of the curtain airbag cushion 200, and a lower end portion of the cushion tether 320 overlaps with the cushion tether 320 by passing through the tether coupling portion 312 and then is sewing-coupled to the cushion tether 320.

According to an exemplary embodiment of the present disclosure, the curtain airbag apparatus includes a tearing bar 800 provided at the upper end portion of the vertical hole 510 to across the vertical hole. The tearing bar 800 holds a location of the tether carriage 310 by being in contact with a lower end portion of the carriage protrusion 311 in the folded state of the curtain airbag cushion 200.

When the inflator 100 is operated to generate the airbag gas and the curtain airbag cushion 200 is deployed, the deployment pressure of the curtain airbag cushion 200 is transmitted to the tether carriage 310 via the cushion tether 320. The lower surface 710 of the carriage holder 700 in which the tether carriage 310 is inserted and the tearing bar 800 are torn and broken, simultaneously. Therefore, the tether carriage 310 is separated from the carriage holder 700 and moves downward along the vertical hole 510.

Hereinbelow, the operation of the curtain airbag apparatus according to an exemplary embodiment of the present disclosure will be described.

FIGS. 1 to 7 are views showing a state in which a side collision does not occur, the curtain airbag apparatus is not operated, and the curtain airbag cushion 200 is in the folded state.

When the curtain airbag cushion 200 is in the folded state, the tether carriage 310 is located at the upper end portion of the vertical hole 510 and inserted into the carriage holder 700, and the carriage protrusion 311 of the tether carriage 310 is supported by the tearing bar 800. The tether carriage 310 is arranged while the location thereof is held at the upper end portion of the vertical hole 510 by the above structure.

Figure 8:
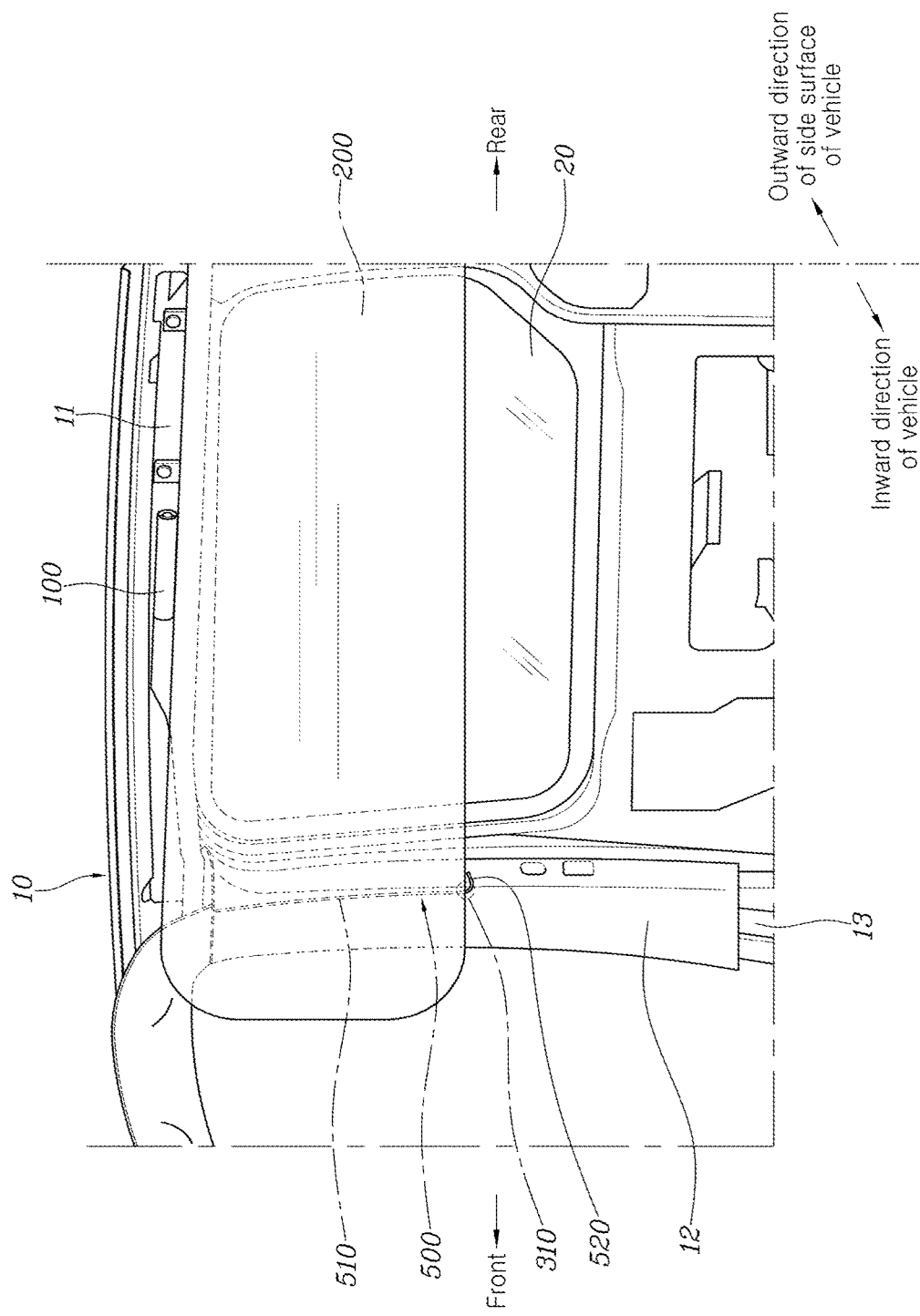
FIG. 8 is a view showing a state in which the tether carriage moves to a lower portion of a guide hole as the curtain airbag cushion is deployed in FIG. 1.

FIG. 8 is a view showing a state in which a side collision occurs and the curtain airbag cushion 200 is deployed downward.

When a side collision occurs, the inflator 100 is operated to generate the airbag gas and the curtain airbag cushion 200 is deployed downward, the deployment pressure of the curtain airbag cushion 200 is transmitted to the tether carriage 310 via the cushion tether 320, and the lower surface 710 of the carriage holder 700 in which the tether carriage 310 is inserted is torn and at the same time the tearing bar 800 is torn. Therefore, the tether carriage 310 is separated from the carriage holder 700 and moves downward along the vertical hole 510.

When the tether carriage 310 is located at the lower end portion of the vertical hole 510, the curtain airbag cushion 200 is in a full down deployment state.

When the side collision occurs, the upper body of the occupant is brought into contact with the deployed curtain airbag cushion 200 due to inertial movement. An external force generated by contact with the occupant is applied to the curtain airbag cushion 200 and the external force is transmitted to the tether carriage 310 via the cushion tether 320. Therefore, the tether carriage 310 moves from the lower end portion of the vertical hole 510 in the outward direction from the side surface of the vehicle along the horizontal hole 520.

Figure 9:
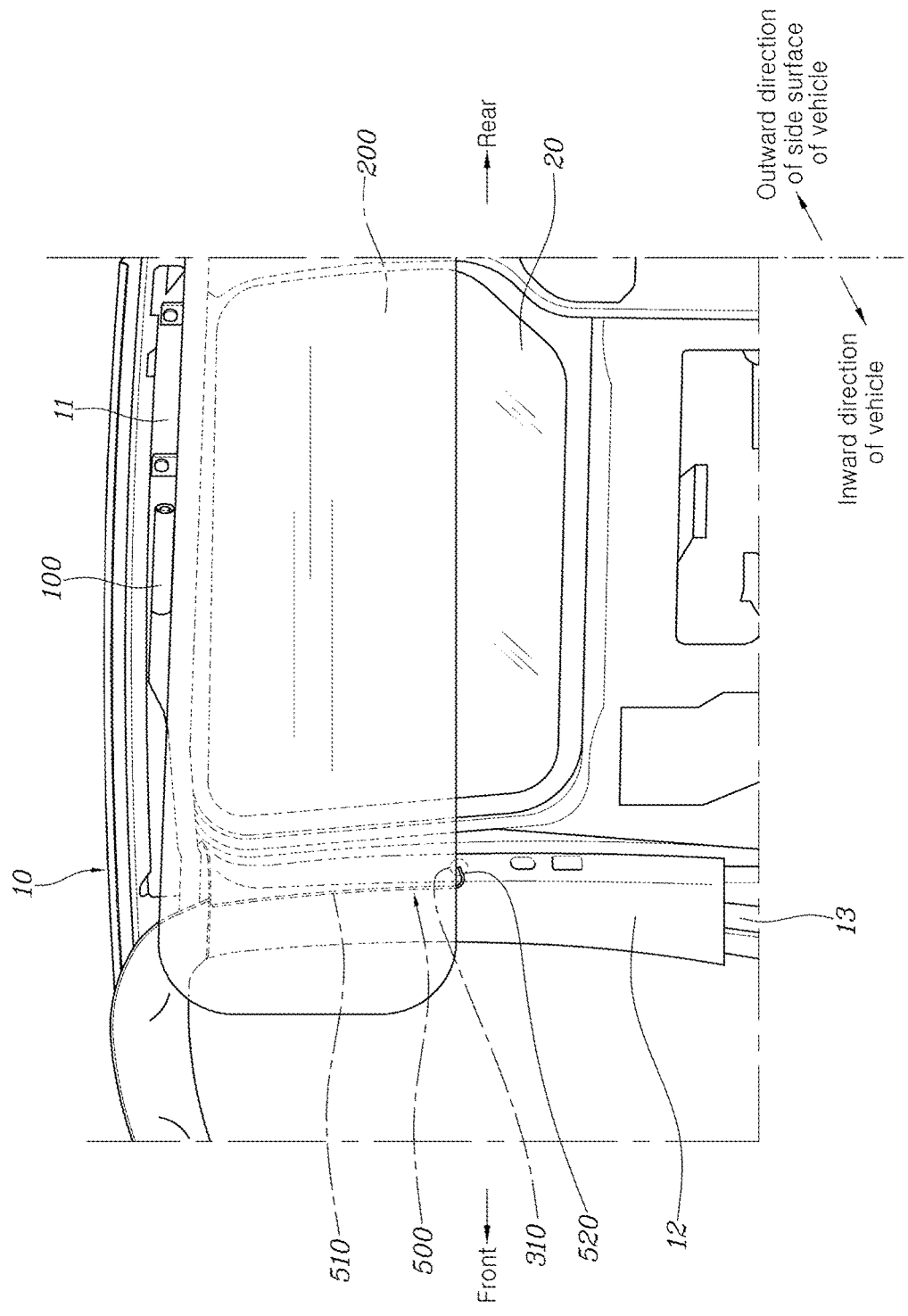
FIG. 9 is a view showing a state in which the tether carriage moves sideways of the guide hole as an external force due to an occupant is applied to the curtain airbag cushion deployed in FIG. 8.

As shown in FIG. 9, when the tether carriage 310 is blocked at an end portion of the horizontal hole 520 and stops moving, the restriction force of the curtain airbag cushion 200 by the cushion tether 320 becomes been restricted. The occupant movement may be more securely restricted in a side collision due to the curtain airbag cushion 200 with the reinforced restriction force. As a result, even when the panorama window 20 is used as the vehicle side window, the occupant may be prevented from being thrown through the side window during a side collision.

Figure 10:
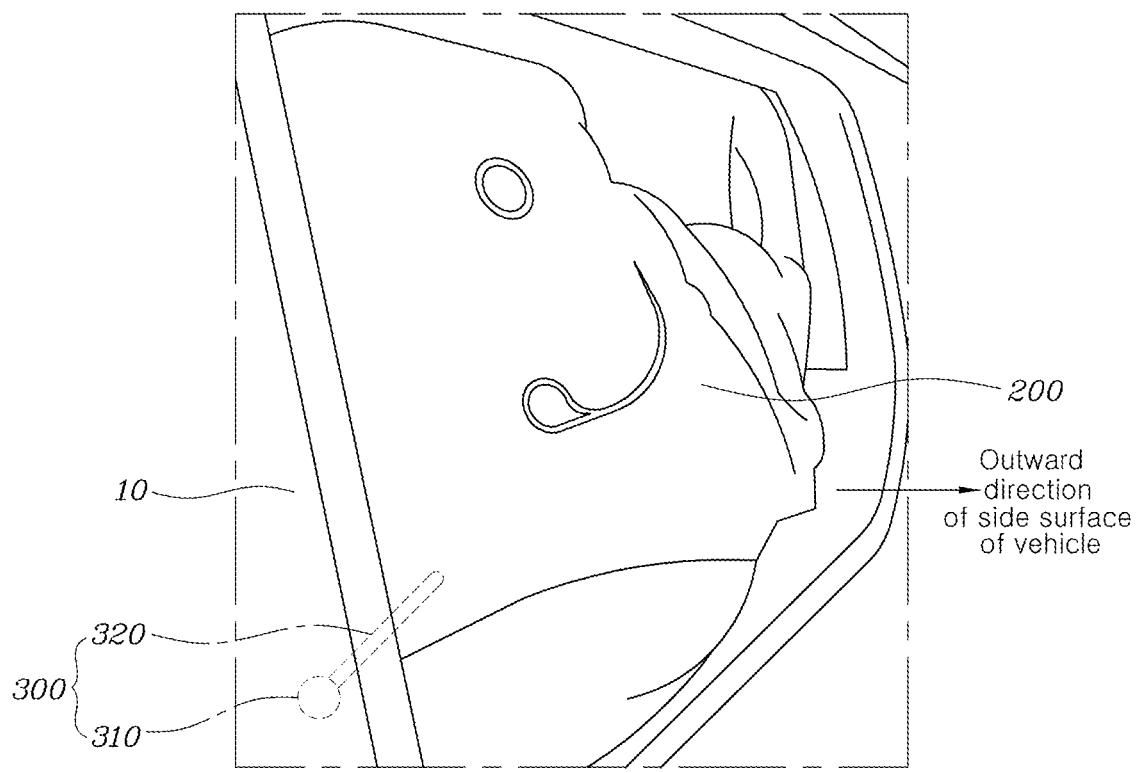
FIG. 10 is a view of FIG. 9 from the outside of the vehicle.

FIG. 10 is a view for FIG. 9 from the outside of the vehicle.

As described above, the curtain airbag apparatus according to an exemplary embodiment of the present disclosure has following advantages. The curtain airbag cushion 200 may be connected to the vehicle body 10 by the cushion restriction device 300 including the tether carriage 310 and the cushion tether 320, and thus reinforcing the restriction force of the deployed curtain airbag cushion 200. The curtain airbag cushion 200 with the reinforced restriction force secures the restriction on the occupant movement in a side collision. Accordingly, even when the panorama window 20 is used as the side window, the occupant may be prevented from being thrown through the side window during a side collision and thus promoting improvement in occupant safety in a side collision and improvement in productivity.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A curtain airbag apparatus for a vehicle, the curtain airbag apparatus comprising:
    an inflator securely provided on a roof side panel of the vehicle;
    a curtain airbag cushion connected to the inflator, and provided at the roof side panel in a folded state while extending in a longitudinal direction of the vehicle; and
    a cushion restriction device connecting the curtain airbag cushion to a vehicle body, and configured to move along a deployment direction of the curtain airbag cushion during deployment of the curtain airbag cushion, and configured to reinforce a restriction force of the curtain airbag cushion by acting a support force with respect to an external force when the external force is applied to the deployed curtain airbag cushion, wherein the cushion restriction device includes:
 a tether carriage configured to move in vertical and horizontal directions along a guide hole of a pillar trim forming the vehicle body; and
 a cushion tether coupled to the curtain airbag cushion and the tether carriage to connect the curtain airbag cushion to the tether carriage.

2. The curtain airbag apparatus of claim 1, wherein the curtain airbag cushion is folded in a zig-zag manner so that a ridge portion and a valley portion of the curtain airbag cushion are alternately arranged and overlap with each other to be in a surface-contact with each other.

3. The curtain airbag apparatus of claim 1, wherein the curtain airbag cushion is taped by a holding member in the folded state and then is mounted to the roof side panel.

4. The curtain airbag apparatus of claim 1, wherein the guide hole formed in the pillar trim includes:
 a vertical hole extending downwardly from an upper portion of the pillar trim; and
 a horizontal hole extending from a lower end portion of the vertical hole in an outward direction from a side surface of the vehicle.

5. The curtain airbag apparatus of claim 4, wherein the guide hole includes a slit hole to connect an upper end portion of the vertical hole to the upper portion of the pillar trim.

6. The curtain airbag apparatus of claim 4, wherein when the curtain airbag cushion is in the folded state, the tether carriage is located at an upper end portion of the vertical hole;
 when the curtain airbag cushion is deployed, a deployment force of the curtain airbag cushion is transmitted to the tether carriage via the cushion tether so that the tether carriage moves downward along the vertical hole;
 when the external force is applied to the curtain airbag cushion after the curtain airbag cushion is deployed, the external force is transmitted to the tether carriage via the cushion tether so that the tether carriage moves from the lower end portion of the vertical hole in the outward direction from the side surface of the vehicle along the horizontal hole; and
 when the tether carriage is blocked by an end portion of the horizontal hole and stops moving, the restriction force of the curtain airbag cushion by the cushion tether is reinforced.

7. The curtain airbag apparatus of claim 4, further including:
 a carriage holder provided at an upper end portion of the vertical hole of the pillar trim and configured to hold a location of the tether carriage as the tether carriage is inserted into the carriage holder in the folded state of the curtain airbag cushion.

8. The curtain airbag apparatus of claim 7, wherein, when deployment pressure of the curtain airbag cushion is transmitted to the tether carriage via the cushion tether during deployment of the curtain airbag cushion, a lower surface of the carriage holder is broken and the tether carriage is separated from the carriage holder and moves downward along the vertical hole.

9. The curtain airbag apparatus of claim 4, further including:
 a carriage holder provided at an upper end portion of the vertical hole of the pillar trim and configured to store the tether carriage in the carriage holder in the folded state of the curtain airbag cushion; and
 a tearing bar provided to cross the vertical hole.

10. The curtain airbag apparatus of claim 9, wherein the tether carriage includes:
 a carriage protrusion configured to move along the guide hole while being inserted into the guide hole; and
 a tether coupling portion formed by protruding from the carriage protrusion and connected to the cushion tether,
 wherein the tearing bar is in contact with the carriage protrusion protruding from the tether carriage.

11. The curtain airbag apparatus of claim 9,
 wherein, when deployment pressure of the curtain airbag cushion is transmitted to the tether carriage via the cushion tether during deployment of the curtain airbag cushion, a lower end portion of the carriage holder and the tearing bar are broken and the tether carriage moves downward along the vertical hole.

12. The curtain airbag apparatus of claim 1, wherein the tether carriage includes:
 a carriage protrusion configured to move along the guide hole while being inserted into the guide hole; and
 a tether coupling portion formed by protruding from the carriage protrusion and connected to the cushion tether.

13. The curtain airbag apparatus of claim 12, further including:
 a tearing bar provided at an upper end portion of a vertical hole to cross the vertical hole and configured to hold a location of the tether carriage by being in contact with a lower end portion of the carriage protrusion in the folded state of the curtain airbag cushion.

14. The curtain airbag apparatus of claim 13,
 wherein, when deployment pressure of the curtain airbag cushion is transmitted to the tether carriage via the cushion tether during deployment of the curtain airbag cushion, the tearing bar is broken and the tether carriage moves downward along the vertical hole.

15. The curtain airbag apparatus of claim 1, wherein the pillar trim including the guide hole for movement of the tether carriage is a center pillar trim forming the vehicle body in cooperation with a center pillar panel of the vehicle.

* * * * *